United States Patent [19]

Morley

[11] Patent Number: 4,468,552

[45] Date of Patent: Aug. 28, 1984

[54] METHOD OF APPLYING HARD SURFACES TO GATE VALVES AND THE LIKE

[75] Inventor: John D. Morley, Bay City, Mich.

[73] Assignee: Advanced Technologies, Inc., Bay City, Mich.

[21] Appl. No.: 428,369

[22] Filed: Sep. 29, 1982

[51] Int. Cl.³ ............................................. B23K 15/00
[52] U.S. Cl. ............................. 219/121 EC; 219/121 ED
[58] Field of Search ................. 219/121 EC, 121 ED, 219/121 LC, 121 LD, 118 WM, 137 WM

[56] References Cited

U.S. PATENT DOCUMENTS 3,418,708  12/1968  Siver ........................ 219/121 EM X
3,952,180   4/1976  Gnanamuthu ........... 219/121 LD X
4,306,139  12/1981  Shinozaki et al. ............. 219/118 X

FOREIGN PATENT DOCUMENTS 22605    1/1981  European Pat. Off. ..... 219/121 ED
2726812 12/1977  Fed. Rep. of Germany ...... 219/121 ED Primary Examiner—C. L. Albritton
Attorney, Agent, or Firm—Learman & McCulloch

[57] ABSTRACT

The resulting product and a method of applying hard surfaces to gate valves and like generally planar metallic bodies which are subject to hard wear wherein a relatively thin generally planar facing plate is formed and applied to the face of the body to provide an assembly to be welded and a series of high power density welding beams of high energy electrons are directed at the face surface of the facing plate while moving the beams and assembly relatively in passes wherein the welds effected span the facing to secure the relatively thin plate to the body in a manner to avoid surface cracks, porosity and warpage to provide a hard wear-resistant facing for the body.

8 Claims, 3 Drawing Figures

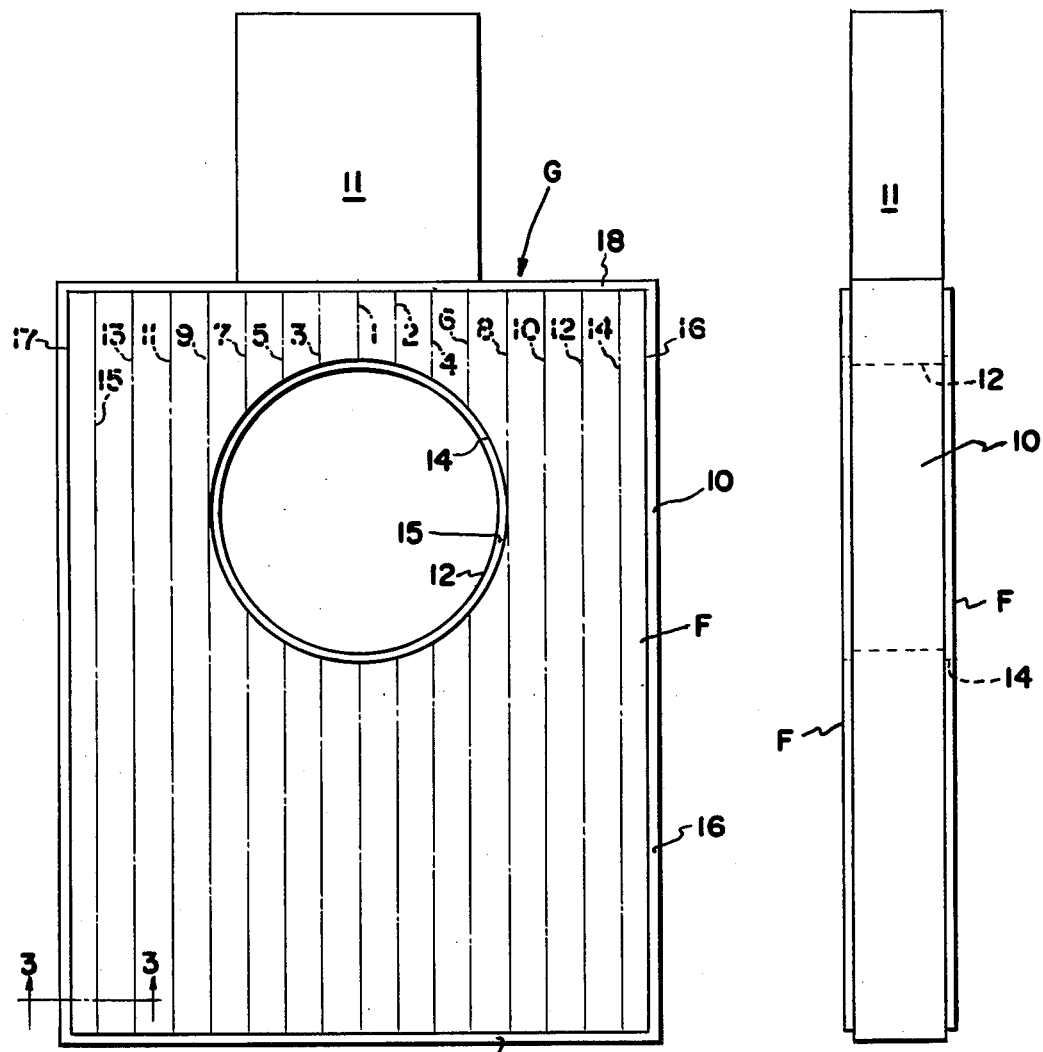
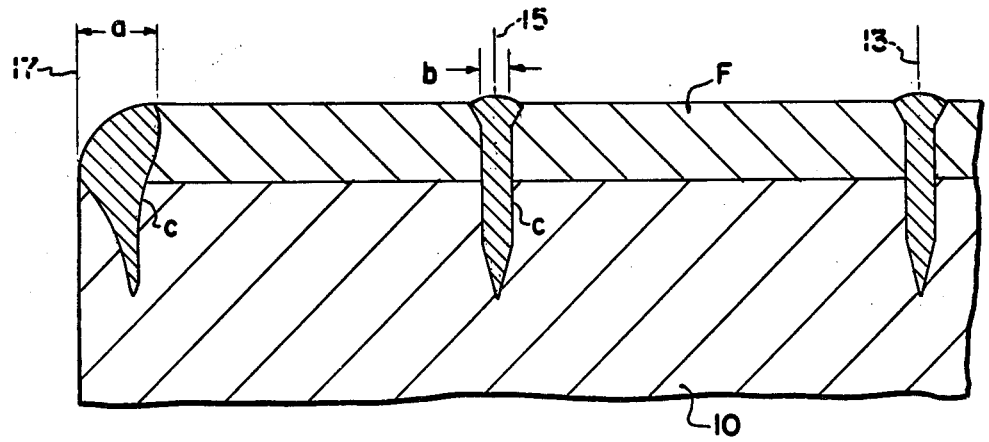
FIG.1  FIG.2  FIG.3

METHOD OF APPLYING HARD SURFACES TO GATE VALVES AND THE LIKE

BACKGROUND OF THE INVENTION

The present invention relates to gate valves and other devices wherein one flat plate slides against another flat plate, and more particularly to an improved method for applying a hard wear-resistant surface to a softer metal body member, such as a gate valve gate and a gate valve seat insert.

In the past, hard wear-resistant surfaces have been formed on parts of gate valves and the like by depositing an alloy in powder form on the surface, then heating it to a molten state. After cooling, a grinding procedure follows to reduce the hard coat to tolerance, such that the part can be used in a gate valve or slide, wherein the valve gate has a sealed liquid-tight relationship with the valve seat against which it slides. This method results in a waste of considerable material which is ground off the entire coated surface, and further the stresses and contamination caused by heat build-up tend to cause cracks, porosity and warpage. The process has proven, therefore, somewhat uneconomical, and is not the trouble-free process which is desired.

It has been suggested in U.S. Pat. No. 3,418,708 that a valve disc, and an annular valve seat for a globe valve located inside a recess, can be bonded in position by a beam of high energy charged particles directed parallel to the weld joint surfaces. U.S. Pat. No. 4,306,139 discloses a method for arc welding a hard material consisting of nickle and tungsten carbide particles, directly to an iron base member. No known prior art, however, discloses a method of fixing a relatively large area thin facing sheet to a gate valve or other flat plate to provide a wear-resistant surface thereon in a trouble-free, economical manner, where the facing and gate or seat insert body member are bonded in a fluid-tight, distortion-free relationship.

One of the prime objects of the present invention is therefore to provide a method of economically and reliably making gates and seat inserts for gate valves, having a hardened surface on one or both sides, which will be wear-resistant and resist corrosive influences.

Another object of the invention is to provide a method of electron beam welding such parts in a manner which avoids warpage, and avoids the formation of cracks and porosity.

Still another object of the invention is to provide parts for gate valves having hard, abrasive-resistant facings which effectively resist the galling that such gate valve parts otherwise experience in use, and which are capable of withstanding the high pressures to which they are subjected when in use, without destructing.

SUMMARY OF THE INVENTION

The invention involves a method wherein a relatively thin facing is electron beam welded to one or both sides of a gate or insert seat for a gate valve or the like, by a method which minimizes heat stressing, distortion shrinkage, and contamination of the parts which are joined.

BRIEF DESCRIPTION OF THE DRAWINGS

FIG. 1 is a front or face elevational view of a gate for a gate valve illustrating a facing which has been electron beam welded in place, the chain lines indicating the pattern of welding which is employed.

FIG. 2 is an edge elevational view thereof; and

FIG. 3 is a greatly enlarged, cross-sectional view taken on the line 3—3 of FIG. 1.

Referring now more particularly to the accompanying drawings, a gate for a gate valve is generally shown at G as having a base part 10 with an operating tang portion 11. The base part 10 and tang 11 are usually formed of a softer metal, i.e. stainless steel or carbon steel such as 4140, 4130, 410, 310 and the like, and it should be noted that base 10 has a valve opening 12 provided therein.

In practice, with oil pressures of possibly 10,000 p.s.i. in the oil line, the surfaces of such a valve gate tend to gall when they are slid into and out of position against the valve seat. The present inventor solves this problem by using hard facing sheets made up of wear-resistant alloys, such as cobalt base alloys (or nickle base alloys for corrosion resistance) to the desired dimension, and electron beam welding them in position. Typically, cobalt alloy 6B is used. In the present instance, such a hard facing F is applied to each side surface of valve body 10, and it should be noted that the facings F are provided with similar openings 14 which are slightly greater in diameter than the openings 12. It should also be noted that hard facing may be required on only one surface, depending on the application of the part. This would, for instance, be the case with a seat insert which will be like the gate illustrated except that there will be no valve opening 12 or tang 11.

The facings F will be on the order of 0.030 to 0.180 inches in thickness, i.e. typically 0.040 inches in thickness.. The marginal space 15, which is left between the marginal edge of opening 12 and the marginal edge of openings 14 similarly will be about 1/16 of an inch, and the facing plates F will be so sized as to leave a similar perimetral margin 16 of about 1/16 inch around the edges of plates F.

In FIG. 1, the chain lines 1-17 illustrate the lines of weld which are used in electron beam welding the plates F in position on the valve body 10. Each line represents the path of a beam of high energy electrons which are focused at the facing F, first on one side of the body 10 and then on the other, the intensity of the beam being regulated to ensure a sufficient energy density and penetration of the beam through the thickness of the facings F into the body of the gate valve 10. It should be noted that the weld pattern may be of a configuration other than straight lines.

As the beam penetrates into the body of the metallic components, the high velocity particles (electrons) progressively yield their energy to the metal throughout the depth of penetration to melt the surrounding metal adjacent to the metal area struck by the beam, so that the metal of the two components meld together to form a proper weld fusion in a very narrow channel, which is slightly convergent in character.

As the greatly enlarged view (FIG. 3) shows, the beam has penetrated the facing F and penetrated a like distance into body 10, the dark portions representing the melting which has occurred, and which join the facing F to the side of body 10. The beam of electrons in this method are focused magnetically to provide a relatively narrow range of heating in the localized area where the beam strikes the workpiece, and, by utilizing the method which will be described, it has been found that substantially no distortion and no cracking of the hard facings F occurs. First one facing F is fully welded in position, and then after inversely positioning the valve, the other facing F is welded in position.

As FIG. 1 points out, in this case, the initial electron beam weld occurs along the line 1, and subsequent welds 2 and 3 are then alternatively effected in order on opposite sides of the beam weld 1. This alternative staggering of the beam welds occurs across the facing F, until the marginal side edges of facing F are encountered. It is to be noted that the margin 16 has been left, and, when a somewhat defocused intensified beam is applied to the corner of facing plate F, a rounded off weld area such as shown at 17 results. A typical beam width for the edge or corner welds is shown at a in FIG. 3 and a typical beam width for the intermediate welds is shown at b in the same Figure. Such beam widths create interfacial welds at c. A weld similar to the weld 17 shown in FIG. 3, but circular in shape is then effected at the corner of edge 14. Finally, welds similar to the weld 17, shown in FIG. 3, are effected at the upper and lower edges 18 and 19 of facing plate F.

The method outlined produces virtually no contamination, and no thermal stresses of consequence are generated by the high heat which is so concentrated and localized with this form of welding. Since relatively small amounts of energy are required, the process can be a relatively simple high-speed operation. Also, the minimum distortion introduced by the process greatly simplifies the subsequent grinding operation which need only grind down the spaced apart weld protrusions. Further advantages of the process are that a minimum amount of expensive hard surface material is required and a minimum amount of hard surface material must be laboriously removed by grinding to establish a usable flat surface.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

I claim:

1. A method of applying hard surfaces to gate valves having openings therein, and like generally planar metallic bodies which are subject to hard wear, comprising the steps of:
   a. forming a relatively thin generally planar facing plate relative to the thickness of the body to be protected of a harder, more wear-resistant metal and in a size to serve as a planar facing which has a face surface and edges for the body;
   b. applying the facing plate to the face of the body to provide an assembly to be welded; and
   c. directing a series of high power density welding beams of high energy electrons at the face surface of said facing plate while moving the beams and assembly relatively in passes wherein the welds effected span the facing to secure the relatively thin plate to the body in a manner to avoid surface cracks, porosity and warpage to provide a hard wear-resistant facing for said body.

2. The method described in claim 1 in which the hard wear-resistant facing is of a size relative to the body such as to leave a marginal edge of the body around its periphery when it is clamped to said body to be welded.

3. The method described in claim 2 in which an initial electron beam weld is made centrally, across the face of the facing applied to the body, and then at spaced intervals electron beam welds are made alternately from opposite sides of the central line of weld and parallel thereto until the edges of the facing are reached, and then wider lines of weld using a defocused intensified beam are made along the edges thereof parallel to the previous lines of weld, with the edge opposite the last line of weld made being welded before the opposite edge.

4. The method followed in claim 3 in which a gate valve gate has a substantial opening therein, and the facing is provided with an opening of larger diameter than the opening in the gate, such as to leave a marginal edge of the body exposed around the gate opening when the facing is applied to the gate, and following the welding step outlined in claim 3, a circular line of weld is effected at the circular marginal edge presented with a defocused intensified beam.

5. The method as set forth in claim 4 in which finally a line of weld with the defocused intensified beam is applied at the opposite sides of the wear-resistant facing plate along the exposed marginal edges of the body.

6. The method as set forth in claim 5 in which the weld line protrusions are then removed.

7. A metallic wear plate assembly such as a gate valve base comprising a softer metal base with a much thinner, hard, wear-resistant facing metal plate electron beam welded thereto, there being lines of weld uniting the base and plate, the facing plate leaving a perimetral marginal edge of the base exposed and the lines of weld including lines across the plate at spaced intervals which are made prior to corner welds which are made at the exposed marginal edges of the base to weld the edges of the facing plate thereto.

8. A gate valve having a valve opening therein, comprising a generally rectilinear body having a hard, wear-resistant facing plate on the order of 0.030 to 0.180 inches in thickness applied to at least one face thereof; the facing plate corresponding in size and shape to the body, but being of smaller perimetral dimension to leave a marginal edge of the body around the periphery thereof; and the plate also being provided with an opening of enlarged diameter relative to the opening in the body member such as to leave a circular marginal edge of the body exposed at the opening; electron beam welds comprising narrow, spaced apart parallel lines of weld extending from one end of the facing plate to the other, the lines of weld penetrating through the facing plate to the body and comprising a network of interface welds made first of all in a central line of weld which approximately bisects the said opening and then in spaced parallel lines of weld which are alternately made on opposite sides of the central line of weld until the side edges of the facing are reached, additional lines of weld along the side edges of the facing plate at the exposed marginal edges of the body portion, a circular line of weld around the exposed edge of the circular opening in the facing at the marginal portion of the body which is exposed, and finally lines of weld perpendicular to the previous lines of weld at the other exposed edges of the facing plate along the exposed marginal portions of the body.

* * * * *